US009297335B2

(12) United States Patent
Harris

(10) Patent No.: US 9,297,335 B2
(45) Date of Patent: Mar. 29, 2016

(54) METAL INJECTION MOLDING ATTACHMENT HANGER SYSTEM FOR A COOLING LINER WITHIN A GAS TURBINE ENGINE SWIVEL EXHAUST DUCT

(75) Inventor: Andrew H. Harris, Manchester, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 1778 days.

(21) Appl. No.: 12/046,411

(22) Filed: Mar. 11, 2008

(65) Prior Publication Data
US 2009/0230213 A1  Sep. 17, 2009

(51) Int. Cl.
F02K 1/00 (2006.01)
F02K 1/82 (2006.01)
B22F 3/22 (2006.01)
B22F 5/00 (2006.01)
C04B 35/638 (2006.01)
F02K 1/78 (2006.01)

(52) U.S. Cl.
CPC ............... *F02K 1/822* (2013.01); *B22F 3/225* (2013.01); *B22F 5/00* (2013.01); *B22F 5/009* (2013.01); *C04B 35/638* (2013.01); *F02K 1/004* (2013.01); *F02K 1/78* (2013.01); *F02K 1/82* (2013.01); *F05D 2230/21* (2013.01); *Y02T 50/675* (2013.01)

(58) Field of Classification Search
CPC ............. F02K 1/00; F02K 1/04; F02K 1/78; F02K 1/80; F02K 1/82; F02K 1/822; F01D 25/30
USPC ........................... 60/770, 771, 799, 766, 39.5
See application file for complete search history.

(56) References Cited

U.S. PATENT DOCUMENTS

| 3,926,656 | A | * | 12/1975 | Mangels | 106/272 |
|---|---|---|---|---|---|
| 4,388,414 | A | * | 6/1983 | Mangels et al. | 501/97.2 |
| 5,059,055 | A | | 10/1991 | DeGress et al. | |
| 5,553,999 | A | | 9/1996 | Proctor et al. | |
| 5,593,276 | A | | 1/1997 | Proctor et al. | |
| 6,164,656 | A | | 12/2000 | Frost | |
| 6,391,252 | B1 | * | 5/2002 | David et al. | 419/36 |
| 6,495,207 | B1 | | 12/2002 | Prociw et al. | |
| 6,672,833 | B2 | | 1/2004 | MacLean et al. | |
| 6,702,550 | B2 | | 3/2004 | Darkins, Jr. et al. | |
| 6,733,235 | B2 | | 5/2004 | Alford et al. | |
| 6,884,026 | B2 | | 4/2005 | Glynn et al. | |
| 7,052,235 | B2 | | 5/2006 | Alford et al. | |
| 7,066,470 | B2 | | 6/2006 | Turnquist et al. | |
| 7,134,286 | B2 | | 11/2006 | Markarian et al. | |
| 7,140,189 | B2 | | 11/2006 | Markarian et al. | |
| 7,263,772 | B2 | | 9/2007 | Prociw et al. | |
| 7,269,958 | B2 | | 9/2007 | Stastny et al. | |
| 7,430,867 | B2 | * | 10/2008 | Agg | 60/770 |
| 7,581,399 | B2 | * | 9/2009 | Farah et al. | 60/770 |
| 7,631,481 | B2 | * | 12/2009 | Cowan et al. | 60/39.5 |
| 7,721,522 | B2 | * | 5/2010 | Farah et al. | 60/39.5 |
| 2004/0120841 | A1 | * | 6/2004 | Ott et al. | 419/30 |
| 2005/0155352 | A1 | * | 7/2005 | Agg | 60/770 |
| 2006/0112676 | A1 | * | 6/2006 | Cowan et al. | 60/266 |
| 2006/0131815 | A1 | * | 6/2006 | Meier | 277/414 |
| 2006/0179816 | A1 | * | 8/2006 | Murphy et al. | 60/39.5 |
| 2007/0017817 | A1 | * | 1/2007 | Mueller et al. | 205/640 |
| 2007/0151229 | A1 | * | 7/2007 | Farah et al. | 60/232 |
| 2008/0022689 | A1 | * | 1/2008 | Farah et al. | 60/770 |
| 2009/0077978 | A1 | * | 3/2009 | Figueroa et al. | 60/766 |

\* cited by examiner

*Primary Examiner* — Gerald L Sung
(74) *Attorney, Agent, or Firm* — Carlson, Gaskey & Olds, P.C.

(57) ABSTRACT

An exhaust duct assembly includes an attachment hanger system having at least one component manufactured by metal injection molding (MIM).

18 Claims, 8 Drawing Sheets

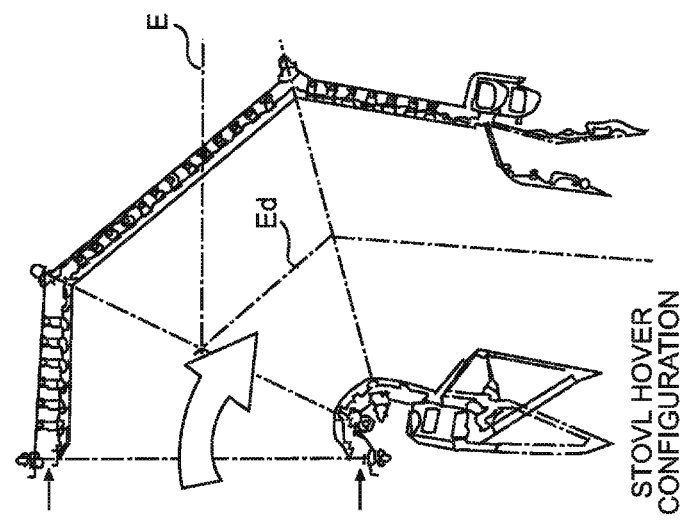
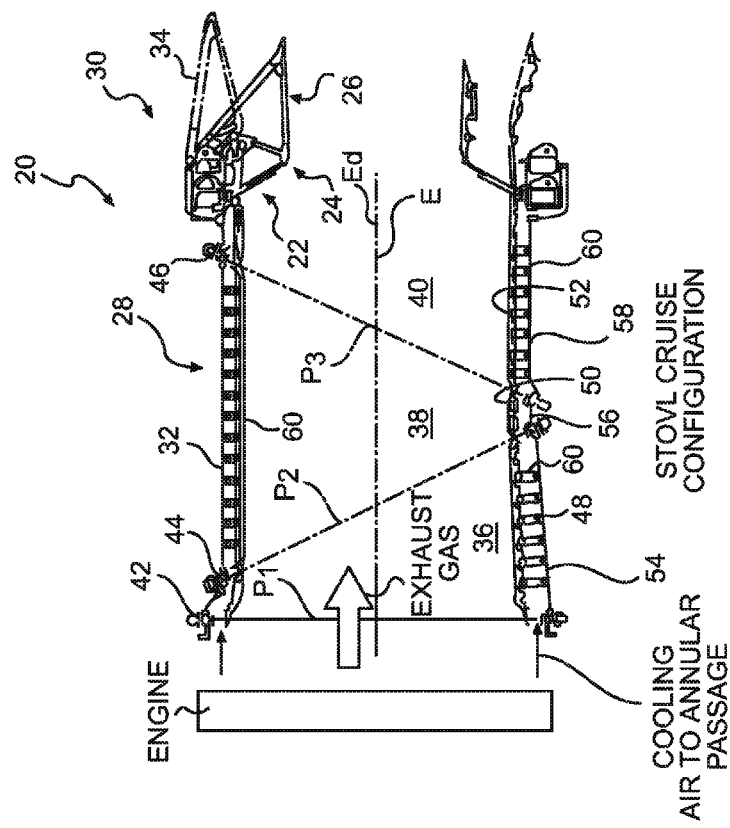
FIG. 1A — STOVL CRUISE CONFIGURATION
FIG. 1B — STOVL HOVER CONFIGURATION

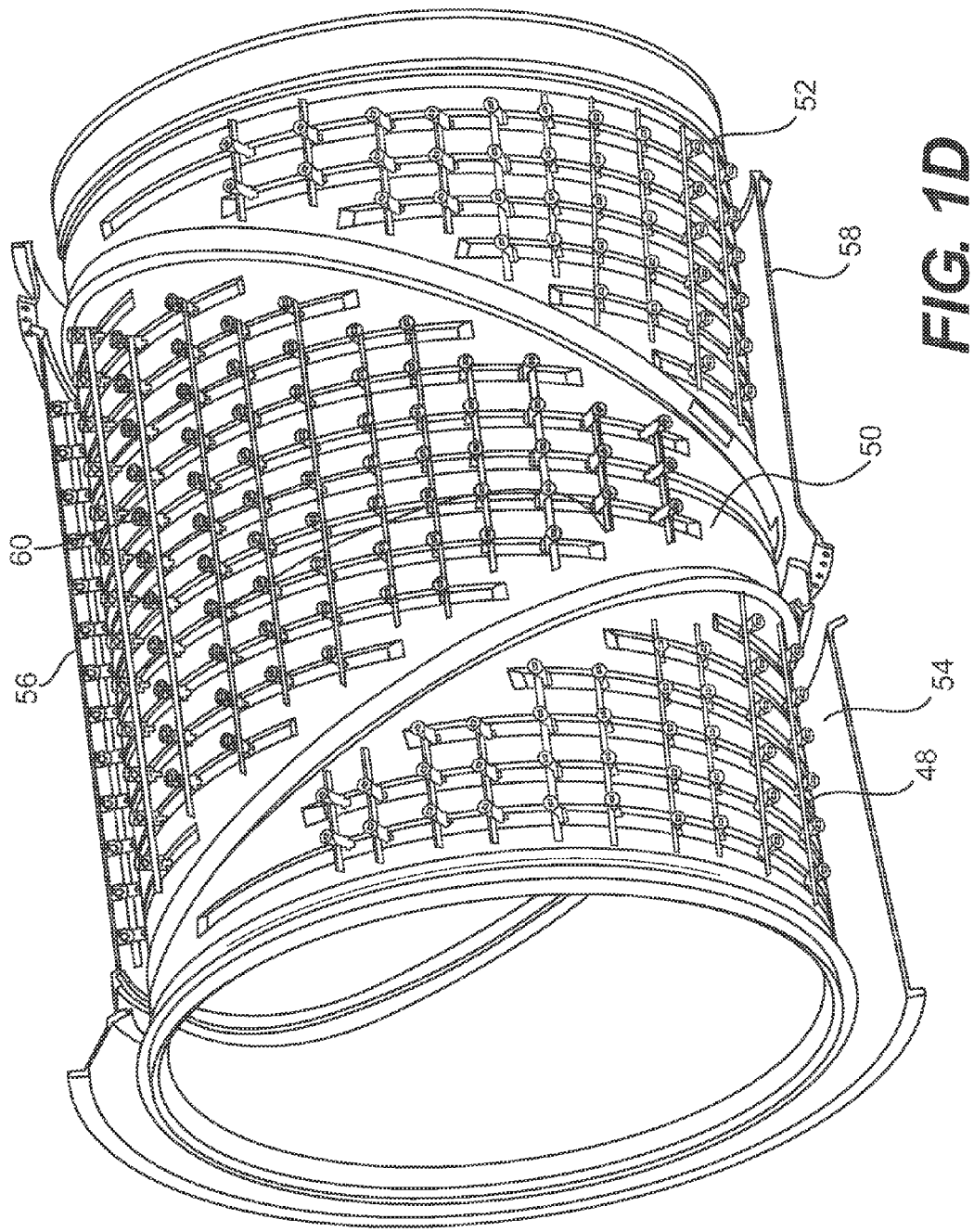

METAL INJECTION MOLDING ATTACHMENT HANGER SYSTEM FOR A COOLING LINER WITHIN A GAS TURBINE ENGINE SWIVEL EXHAUST DUCT

BACKGROUND OF THE INVENTION

The present invention relates to a gas turbine engine attachment hanger assembly including a metal injection molding (MIM) component.

In current gas turbine engine exhaust nozzles, ducts, and augmentors, a liner is disposed between the engine's working medium (exhaust gas path) and the engine outer casing or duct. These may be of single or double walled construction, with a hot sheet and a cold sheet.

Cooling air typically extracted from the engine's compressor is flowed between the cooling liner and duct then discharged over the seals and flaps of the nozzle located at the rear end segment of the exhaust duct. A relatively significant quantity of cooling air is required to properly cool the generally annular area to maintain a positive pressure within the cooling liner.

The attachment of these sheets, liners and outer casing requires many small, precisely made hanger bracket assemblies that have the strength and temperature capability to survive in the exhaust environment. The hanger brackets assembly components are typically manufactured from precision investment castings then machined which, although effective, may result in a weight and manufacturing penalty.

SUMMARY OF THE INVENTION

The exhaust duct assembly according to an exemplary aspect of the present invention includes an exhaust duct case segment; a cooling liner segment; and an attachment hanger system attachable between the exhaust duct case section and the cooling liner segment, the attachment hanger system having at least one component manufactured by metal injection molding (MIM).

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1A is a cross sectional side elevation view of a variable geometry exhaust duct in a cruise position;

FIG. 1B is a cross sectional side elevation view of a variable geometry exhaust duct in a hover position;

FIG. 1D is an expanded partially fragmented view of a cooling liner within the exhaust duct assembly;

DETAILED DESCRIPTION OF THE PREFERRED EMBODIMENT

Figure 1C:
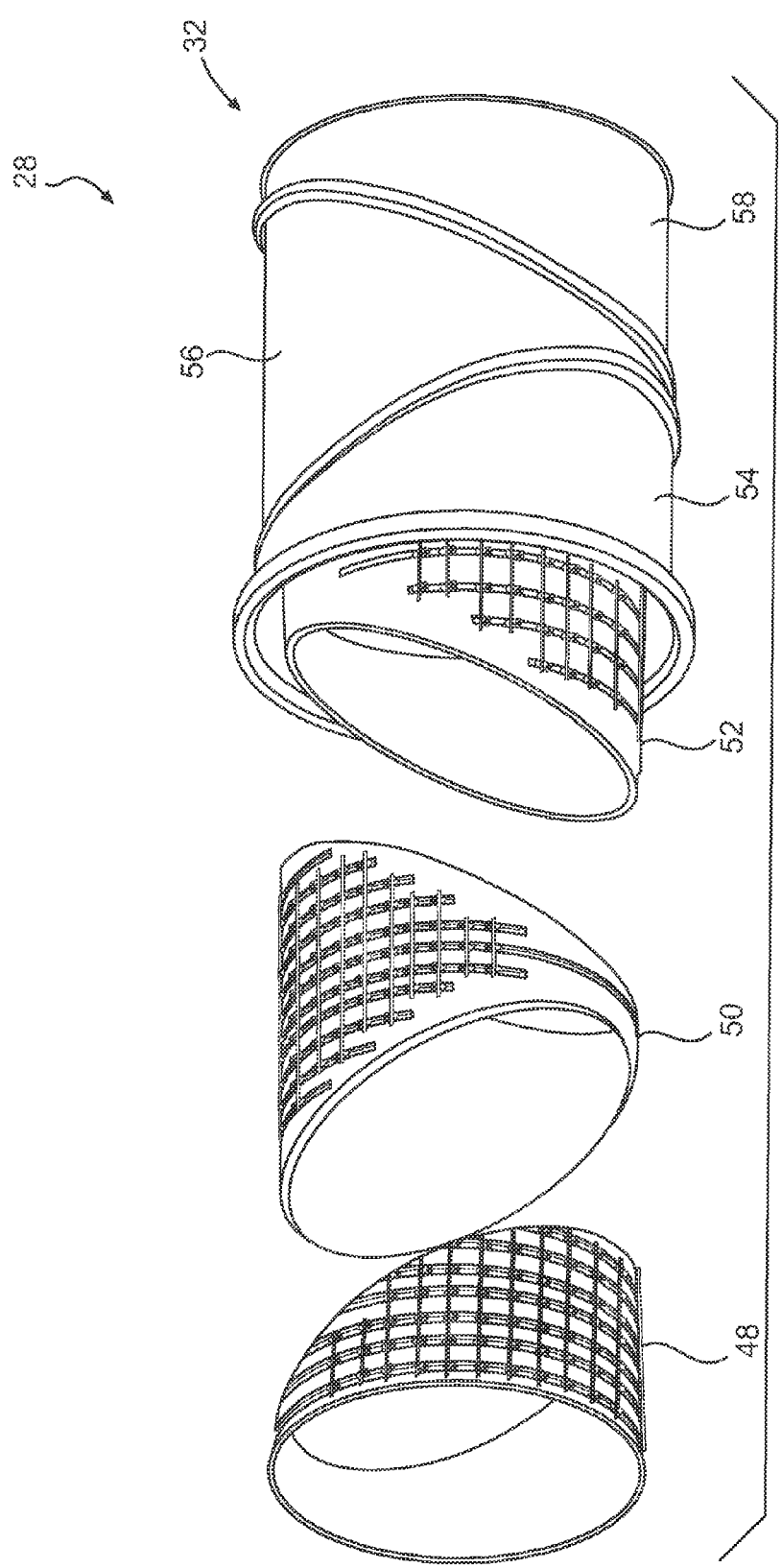
FIG. 1C is an exploded perspective view of the exhaust duct assembly.

FIG. 1A illustrates a sectional view of an exemplary exhaust duct assembly 20 for a gas turbine engine in both an open position (phantom lines), typical of afterburning operation, and in a closed position (solid lines), typical of non-afterburning operation. In a preferred embodiment, the exhaust duct assembly 20 is utilized on an exhaust duct assembly that articulates for use in a short take off vertical landing (STOVL) type of aircraft.

The exhaust duct and nozzle assembly 20 is of the convergent-divergent nozzle type having a convergent flap region 22, a throat region 24, and a divergent flap region 26. The exhaust duct assembly 20 includes an exhaust duct section 28 which communicates with an exhaust nozzle 30.

The exhaust duct section 28 as illustrated herein is a three bearing swivel duct (3BSD) which rotates about three bearing planes ($P_1$, $P_2$, $P_3$) to permit transition between a cruise configuration in which the exhaust duct axis Ed is arranged along an engine axis E (FIG. 1A) and a hover configuration in which the exhaust duct axis Ed is articulated to a position transverse to the engine axis E (FIG. 1B). The outer wall of the exhaust duct section 28 is formed from an exhaust duct case 32 having an aerodynamic nozzle external flap system 34.

The exhaust duct section 28 includes a forward exhaust duct segment 36, an intermediate exhaust duct segment 38 and a rear exhaust duct segment 40. The forward exhaust duct segment 36 is rotatable about the axis E at a first bearing joint 42, the intermediate exhaust duct segment 38 rotates relative to the forward exhaust duct segment 36 at a second bearing joint 44, and the rear exhaust duct segment 40 rotates relative to the intermediate duct segment 38 at a third bearing joint 46. The first bearing joint 42 is disposed along the first bearing plane $P_1$, the second bearing joint 44 is disposed along the second bearing plane $P_2$ and the third bearing joint 46 is disposed along a third bearing plane $P_3$. The second bearing joint 44 and the third bearing joint 46 are generally disposed at a non-normal angle relative the engine axis E.

Figure 1E:
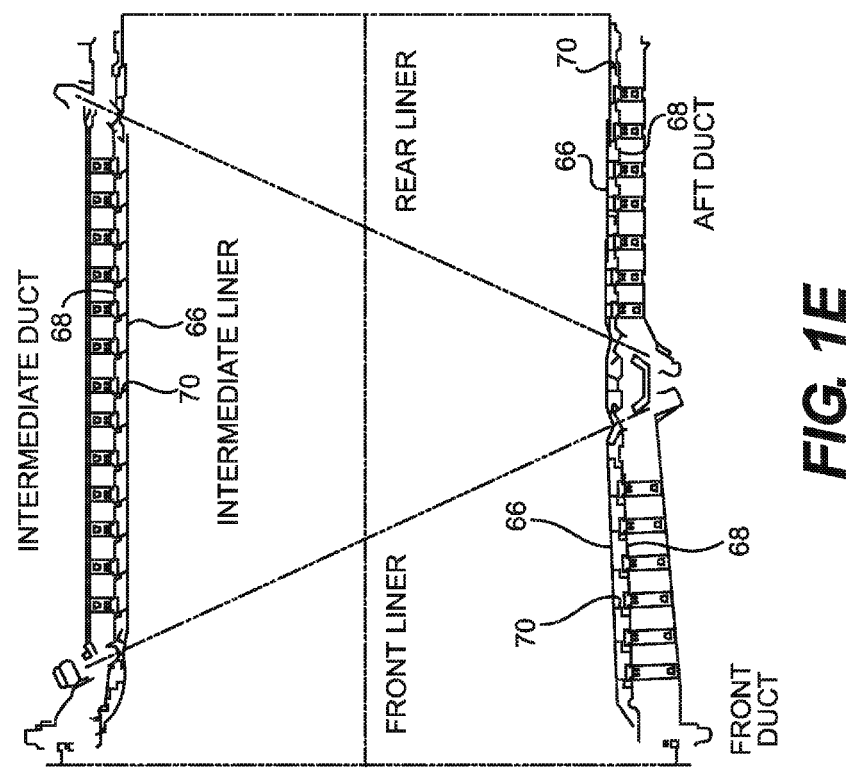
FIG. 1E is an expanded view of a cooling liner within the exhaust duct assembly.

Each of the forward, intermediate and rear exhaust duct segment 36, 38, 40 include a forward, intermediate and rear cooling liner segment 48, 50, 52 which are exposed to the combustion gases and a forward, intermediate and rear outer duct case segment 54, 56, 58 (FIG. 1C) spaced therefrom by an attachment hanger system 60 (FIG. 1D). The cooling liner segment may be a cylindrical, serpentine or other such shaped member. It should be understood that each of the forward, intermediate and rear cooling liner segment 48, 50, 52 is an assembly that generally includes a hot sheet 66 separated from a corrugated cold sheet 68 by a plurality of stiffeners 70 (also illustrated in FIG. 1E). It should also be understood that the term "corrugation" encompasses various rippled or non-planar surfaces that are not to be limited to only the specific "corrugation" disclosed in the illustrated embodiment.

Referring to FIG. 1D, the attachment hanger system 60 is attached between the cold sheet 68 of the forward, intermediate and rear cooling liner segment 48, 50, 52 and the respective forward, intermediate and rear outer duct case segment 54, 56, 58. The attachment hanger system 60 at least partially permits for differential thermal expansion between the cold sheet 68 and the hot sheet 66. An annular passage may be defined between the forward, intermediate and rear cooling liner segment 48, 50, 56 and the forward, intermediate and rear outer duct cases 58, 60, 62 to provide passage of cooling air utilized for insulating the forward, intermediate and rear cooling liner segment 48, 50, 56.

Figure 1G:
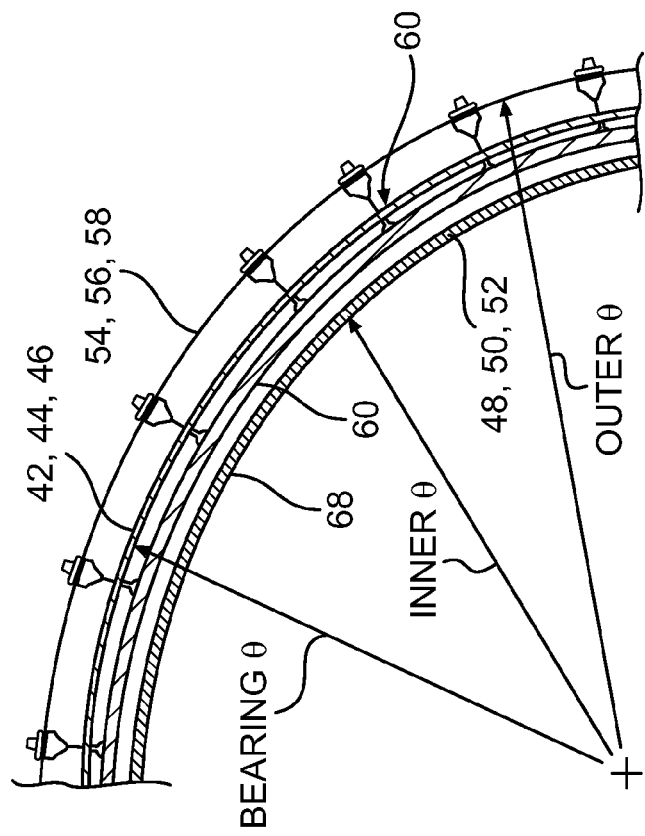
FIG. 1G is a transverse sectional view of the exhaust duct assembly with a foldable attachment hanger system in an unfolded position.
Figure 1F:
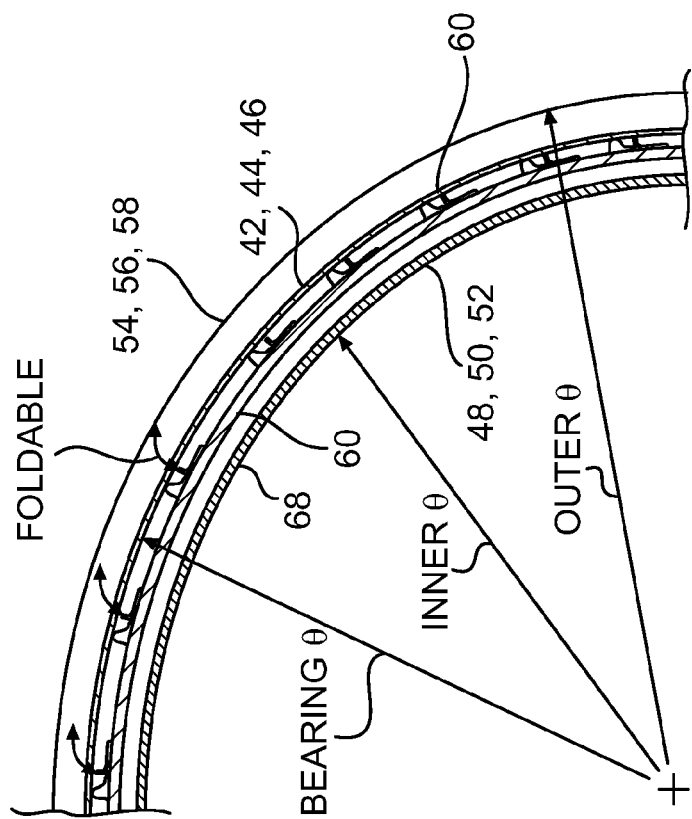
FIG. 1F is a transverse sectional view of the exhaust duct assembly with a foldable attachment hanger system in a folded position.

Referring to FIG. 1F, the foldable attachment hanger system 60 is attached between the cold sheet 68 of the forward, intermediate and rear cooling liner segment 48, 50, 52 and the respective forward, intermediate and rear outer duct case segment 54, 56, 58. The foldable attachment hanger system 60 at least partially permits for differential thermal expansion between the cold sheet 68 and the hot sheet 66. An annular passage may be defined between the forward, intermediate and rear cooling liner segment 48, 50, 56 and the forward, intermediate and rear outer duct cases 58, 60, 62 to provide passage of cooling air utilized for insulating the forward, intermediate and rear cooling liner segment 48, 50, 56.

The forward, intermediate and rear cooling liner segment 48, 50, 52 are complete tubular members which are assembled and disassembled into their respective forward, intermediate and rear outer duct case segments 54, 56, 58 without requiring disassembly of the forward, intermediate and rear outer duct case segments 54, 56, 58 and the first, second and third bearing joint 42, 44 and 46 because of the foldable attachment hanger system 60.

The foldable attachment hanger system 60 folds-down (FIG. 1F) permitting each of the entire tubular cooling liner segments 48, 50, 56 to pass through the radial obstruction defined by the first, second and third bearing joint 42, 44 and 46. Once past the radial obstructions, the foldable attachment hanger system 60 fold-up (FIG. 1G) for subsequent mechanical attachment to the respective outer duct case segment 54, 56, 58 from the outside thereof.

It should be understood that the attachment hanger system 60 includes a plurality of rows within each forward, intermediate and rear cooling liner segment 48, 50, 52 that are generally likewise arranged such that detailed explanation may be constrained to a single hanger assembly 72 (FIG. 2) from a portion of one row of the foldable attachment hanger system 60 as each hanger assembly 72 will be essentially the same.

Figure 2:
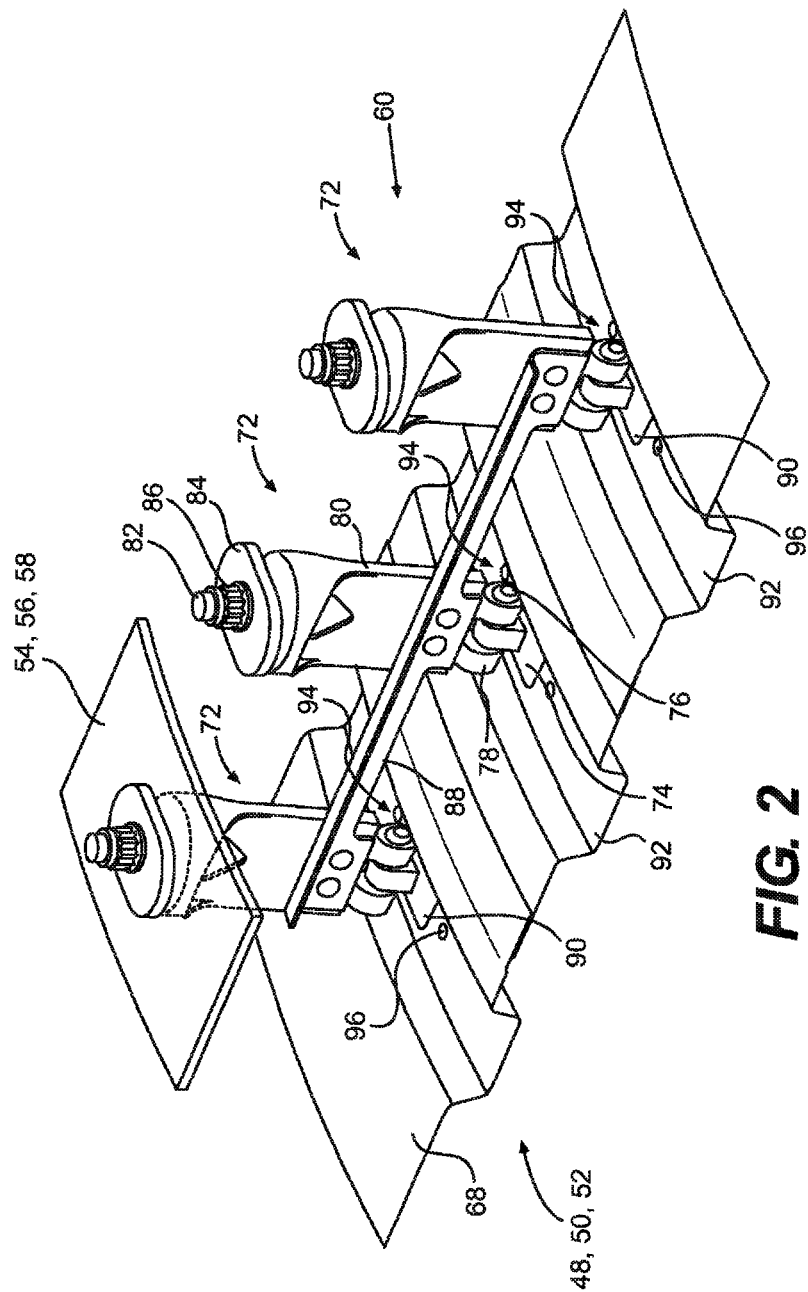
FIG. 2 is a perspective view illustrating the attachment hanger system between a cold sheet of cooling liner assembly and an outer exhaust duct case.

Referring to FIG. 2, a portion of one row of the attachment hanger system 60 is shown assembled between the cold sheet 68 of the forward, intermediate and rear cooling liner segment 48, 50, 52 and, for example, the respective forward, intermediate and rear outer duct case segment 54, 56, 58. The corrugated cold sheet 68 of each of the forward, intermediate and rear cooling liner segment 48, 50, 52 are provided with rectilinear openings 90 within a multitude of corrugation valleys 92. A pin-hinge-cold sheet bracket assembly 94 is inserted through the cold sheet opening 90 then rotated ninety degrees to align the cold sheet bracket 74 with the corrugation 92. Each cold sheet bracket 74 is located on the stiff geometry offered by the liner corrugation 92 providing for an efficient load path. The pin-hinge-cold sheet bracket assembly 94 is then installed with fasteners 96 such as solid rivets, adhesive or the like.

The attachment hanger system 60 provides for axial locating liner to duct case and permits thermally free axial growth. An axial stiffener 88 may be attached such as through rivets to a plurality of hanger assemblies 72 to facilitate increasing axial rigidity and facilitate assembly.

Each hanger assembly 72 of the attachment hanger system 60 includes a cold sheet bracket 74, a pin 76, a hinge 78, duct bracket 80, a T-bolt 82, a flanged bushing 84 and a threaded fastener 86, any or all of which are readily applicable to manufacture through a Metal Injection Molding (MIM) manufacturing method. Whereas hundreds of such components are used per engine, a 25-50% cost reduction may be readily realized.

As a metal forming process, the MIM manufacturing method combines the material flexibility of powder metallurgy and the design flexibility of plastic molding. The MIM manufacturing method generally utilizes a metal mold and the injection of an engineered metal powder followed by scintering. With properties comparable, or better than, those of wrought steel, the MIM manufacturing method is ideally suited to producing small and complex-shaped parts with outstanding mechanical properties that have excellent dimensional characteristics and better structural integrity than investment cast parts at a significant cost reduction.

Figure 3:
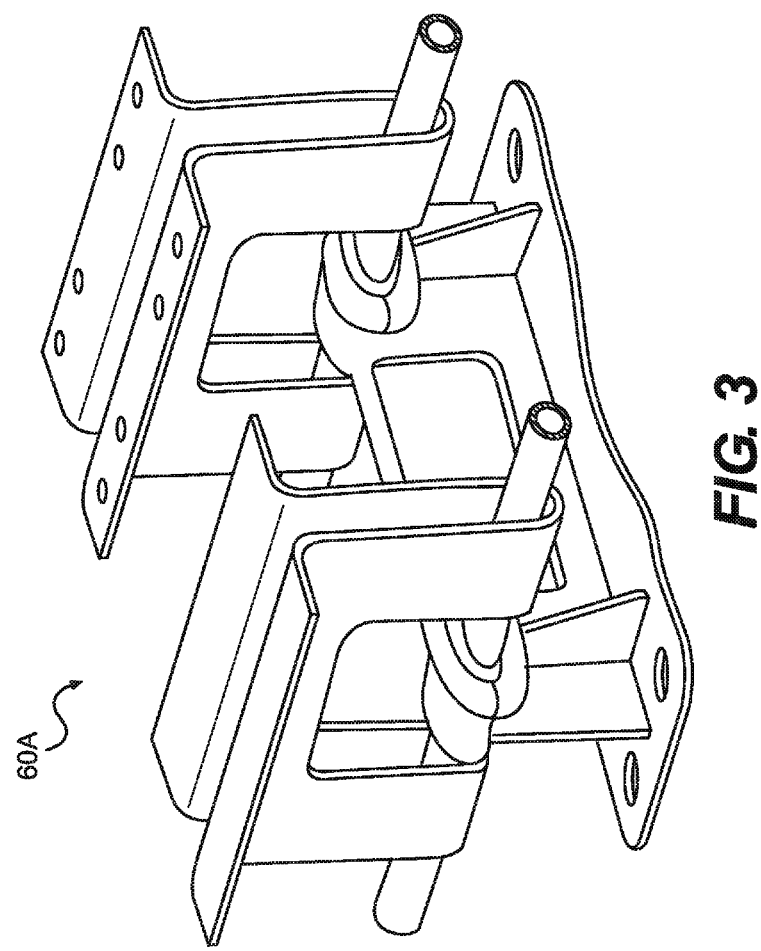
FIG. 3 is a perspective view illustrating another attachment hanger system between a cold sheet of cooling liner assembly and an outer exhaust duct case.
Figure 4:
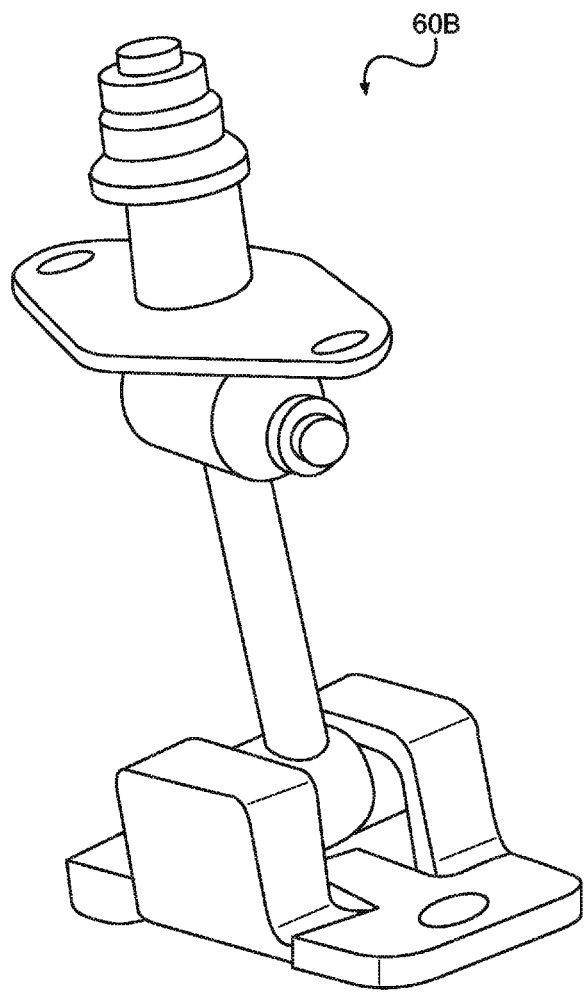
FIG. 4 is a perspective view illustrating a slider link system for a flowpath structure.

Although one non-limiting embodiment of the attachment hanger system 60 is primarily described, it should be understood that components of various other attachment hanger systems 60A (FIG. 3) as well as other links often utilized within a flowpath structure such as a slider assembly 60B (FIG. 4) will also benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An exhaust duct assembly for a gas turbine engine comprising:
    an exhaust duct case segment;
    a cooling liner segment; and
    an attachment hanger system attachable between said exhaust duct case section and said cooling liner segment, said attachment hanger system having at least one component manufactured by metal injection molding (MIM).

2. The assembly as recited in claim 1, wherein said cooling liner segment is a cylindrical or serpentine member.

3. The assembly as recited in claim 1, wherein said exhaust duct case segment supports a bearing joint.

4. The assembly as recited in claim 1, wherein said cooling liner segment includes a hot sheet, a cold sheet and at least one of stiffeners which attach said hot sheet to said cold sheet.

5. The assembly as recited in claim 1, wherein said attachment hanger system extends at through a corrugated cold sheet of said cooling liner segment.

6. The assembly as recited in claim 5, wherein said attachment hanger system is foldable at least partially into said corrugated cold sheet.

7. The assembly as recited in claim 1, wherein said at least one component manufactured by metal injection molding (MIM) comprises a cold sheet bracket.

8. The assembly as recited in claim 1, wherein said at least one component manufactured by metal injection molding (MIM) comprises a pin.

9. The assembly as recited in claim 1, wherein said at least one component manufactured by metal injection molding (MIM) comprises a hinge.

10. The assembly as recited in claim 1, wherein said at least one component manufactured by metal injection molding (MIM) comprises a duct bracket.

11. The assembly as recited in claim 1, wherein said at least one component manufactured by metal injection molding (MIM) comprises a T-bolt.

12. The assembly as recited in claim 1, wherein said at least one component manufactured by metal injection molding (MIM) comprises a flanged bushing.

13. The assembly as recited in claim 1, wherein said at least one component manufactured by metal injection molding (MIM) comprises a threaded fastener.

14. A swivelable exhaust duct assembly for a gas turbine engine comprising:
   a first exhaust duct case segment, said first exhaust duct case segment defines a first inner diameter;
   a second exhaust duct case segment;
   a bearing joint between said first exhaust duct case segment and said second exhaust duct case segment, said bearing joint defining a second inner diameter less than said first inner diameter;
   a cooling liner segment; and
   an attachment hanger system attachable between said first exhaust duct case segment and said cooling liner segment, said attachment hanger system foldable to insert said cooling liner segment into said first exhaust duct case segment, said attachment hanger system having at least one component manufactured by metal injection molding (MIM).

15. The assembly as recited in claim 14, wherein said first exhaust duct case segment is a cylindrical member and said second exhaust duct case segment is cylindrical member.

16. The assembly as recited in claim 15, wherein said cooling liner segment is a cylindrical or serpentine member.

17. The assembly as recited in claim 14, wherein said attachment hanger system comprises at least one hanger bracket assemblies.

18. The assembly as recited in claim 17, wherein at least two of said multitude of hanger bracket assemblies in at least one of said multitude of rows are attached together through an axial stiffener.

* * * * *